US012089023B2

(12) United States Patent
Chen et al.

(10) Patent No.: US 12,089,023 B2

(45) Date of Patent: Sep. 10, 2024

(54) MICRO SPEAKER AND DIAPHRAGM MOLD

(71) Applicant: AAC Microtech (Changzhou) Co., Ltd., Changzhou (CN)

(72) Inventors: Xingchi Chen, Shenzhen (CN); Weimin Chen, Shenzhen (CN); Yao Hui, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 188 days.

(21) Appl. No.: 17/880,699

(22) Filed: Aug. 4, 2022

(65) Prior Publication Data

US 2023/0247363 A1 Aug. 3, 2023

(30) Foreign Application Priority Data

Jan. 29, 2022 (CN) ......................... 202220242939.9

(51) Int. Cl.

*H04R 9/02* (2006.01)

*H04R 9/06* (2006.01)

(52) U.S. Cl.

CPC ............... *H04R 9/025* (2013.01); *H04R 9/06* (2013.01); *H04R 2307/204* (2013.01); *H04R 2400/11* (2013.01)

(58) Field of Classification Search

CPC .... H04R 9/025; H04R 9/06; H04R 2307/204; H04R 2400/11; H04R 9/043; H04R 7/18; H04R 7/127; H04R 7/20; H04R 9/02

See application file for complete search history.

(56) References Cited

U.S. PATENT DOCUMENTS 9,025,808 B2 * 5/2015 Kwon .................... H04R 9/043 381/404

2014/0241566 A1 * 8/2014 Choi ...................... H04R 9/043 381/400

* cited by examiner

*Primary Examiner* — Brian Ensey

(74) *Attorney, Agent, or Firm* — W&G Law Group

(57) ABSTRACT

The present invention discloses a micro speaker, including a frame with a containment space, a magnetic circuit system and a vibration system accommodated in the containment space. The vibration system includes a first diaphragm, a dome skeleton fixed to the first diaphragm, and a voice coil fixed on the dome skeleton. A welding plate structure is fixed on the dome skeleton, and a first circuit board and a second circuit board fixed to the frame respectively. The first diaphragm includes a first diaphragm area and a second diaphragm area. The thickness of the first diaphragm area is greater than the thickness of the second diaphragm area. The local thickening material is adopted to avoid the problem of speaker rigidity asymmetry caused by unbalanced heat distribution, so as to realize the stable operation of the speaker, and the manufacturing process is simple.

9 Claims, 6 Drawing Sheets

MICRO SPEAKER AND DIAPHRAGM MOLD

FIELD OF THE PRESENT DISCLOSURE

The present invention relates to the field of electroacoustic transducers, especially to a micro speaker.

DESCRIPTION OF RELATED ART

A micro speaker is a kind of electroacoustic transducers for being assembled in portable devices. The micro speaker generally includes a frame, a magnet, a pole piece, a sound membrane, a voice coil, a front cover, a wiring board, a damping cloth, etc. Miniaturization is one of the mainstream trends in the development of speakers today. Micro speakers with small size and light weight bring consumers high-quality listening enjoyment.

The existing micro speaker unit generates heat at the welding point and conducts heat from the lead wire of the voice coil during operation, resulting in asymmetric heat of the unit. Wherein, the material of vibration diaphragm of speaker is mostly polymer material, and its elastic modulus is affected by temperature. Due to the asymmetry of the temperature on both sides of the monomer, the rigidity of the two sides of the monomer will be asymmetric, which will cause a rocking phenomenon and affect the sound performance of the speaker.

SUMMARY OF THE PRESENT INVENTION

The main purpose of the present invention is to provide a micro speaker, which aims to solve the problem in the related art that the speaker unit generates heat in the welding part and the lead wire transfers heat. The heat asymmetry of the monomer leads to the problem of rigidity asymmetry.

Accordingly, the present invention provides a micro speaker, comprising: a frame with a containment space; a magnetic circuit system accommodated in the containment space; a vibration system accommodated in the containment space, including a first diaphragm arranged on one side of the frame, and a dome skeleton fixed to the first diaphragm; a voice coil fixed to the dome skeleton near a side of the magnetic circuit system, including a lead wire; and a welding plate structure fixed on a side of the dome skeleton where the voice coil locates at, for being electrically connected to the lead wire.

The first diaphragm includes a first fixation part connected to the dome skeleton, a suspension connected to an outer side of the first fixation part, and a second fixation part connected to a side of the suspension away from the first fixation part and fixed to the frame.

The micro speaker further includes a first circuit board electrically connected to the welding plate structure and a second circuit board respectively fixed to two ends of the frame away from the second fixation par;

The first diaphragm includes a first diaphragm area whose projection along a vibration direction is located in a projection area of the first circuit board, and a second diaphragm area which is connected with the first diaphragm area and forms the first diaphragm together with the first diaphragm area; a thickness of the first diaphragm area is greater than a thickness of the second diaphragm area.

In addition, the thickness of the first diaphragm area gradually decreases in a direction away from the welding plate structure.

In addition, outer surfaces of the first diaphragm area and the second diaphragm area have a smooth transition.

In addition, the dome skeleton includes a bottom plate connected to the first diaphragm and two side walls bending and extending toward the magnetic circuit system from two opposite edges in a direction of a long axle of the bottom plate; the bottom plate is fixedly connected to the first fixation part; the voice coil is fixed on the bottom plate near the plate surface of the magnetic circuit system; the welding plate structure is fixed to the bottom plate with the plate surface of the voice coil and located between one of the side wall and the outer wall in the direction of the long axle of the voice coil adjacent to the side wall.

In addition, ends of the first circuit board and the second circuit board that are away from the frame are respectively fixed to the end surfaces of the two side walls that are away from the bottom plate.

In addition, the welding plate structure includes a welding plate fixed on the bottom plate, a welding ball fixed on the welding plate, and the lead wire of the voice coil connects to the welding ball; the welding plate is electrically connected to the first circuit board.

In addition, the micro speaker further comprises two second diaphragms respectively disposed on the side of the frame away from the first diaphragm; one of the second diaphragms is fixedly connected to the side of the first circuit board away from the first diaphragm, the other second diaphragm is connected to the side of the second circuit board away from the first diaphragm.

In addition, the magnetic circuit system includes a first magnet with a containment groove and a second magnet contained in the containment groove for forming a circular magnetic gap therebetween.

The present invention further provides a diaphragm mold, comprising a first mold and a second mold enclosing a cavity with the first mold, wherein the cavity is matched with the first diaphragm as described above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
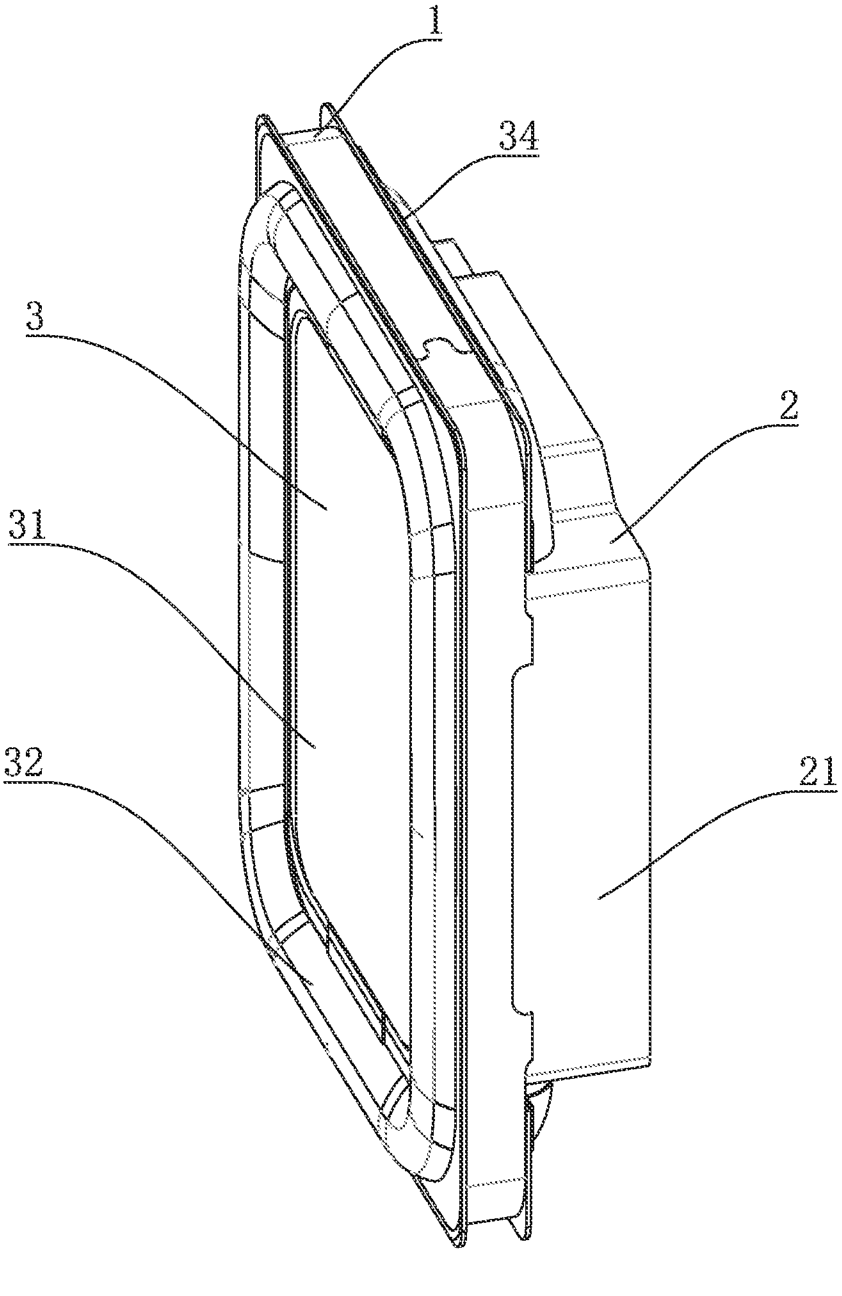
FIG. 1 is an isometric view of a micro speaker in accordance with an exemplary embodiment of the present invention.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Please refer to FIGS. 1-4, the first aspect of the application provides a vibration overbalanced micro speaker, the micro speaker includes a frame 1 having a containment space, and a magnetic circuit system 2 and a vibration system 3 housed in the containment space, and the vibration system 3 includes a first diaphragm 32 provided on one side of the frame 1, a dome skeleton 31 fixed to the first diaphragm 32, and a voice coil 33 fixed to the dome skeleton 31 on the side close to the magnetic circuit system 2. The first diaphragm 32 includes a first fixation part 321 connected to the dome skeleton 31, a suspension 323 connected to the outer side of the first fixation part 321, and a second fixation part 322 connected to the side of the suspension 323 away from the first fixation part 321 and fixed to the frame 1. The micro speaker further includes a welding plate structure 4 fixed on the side of the dome skeleton 31 where the voice coil 33 is provided, and a first circuit board 51 and a second circuit board 52 respectively fixed on both ends of the base frame 1 away from the second fixation part 322. Voice coil 33 includes a lead wire 43 electrically connected to the welding plate structure 4, the welding plate structure 4 is connected to the first circuit board 51. The first diaphragm 32 includes a first diaphragm area 324 whose projection in the direction of vibration is located in the projection area of the first circuit board 51 and a second diaphragm area 325 which is connected to the first diaphragm_area 324 and together enclosed to form the first diaphragm. The thickness of the first diaphragm area 324 is greater than the thickness of the second diaphragm area 325.

In this embodiment, when the micro speaker unit works, the welding point in the welding plate structure 4 generates heat and the lead wire transfers heat, that is, the heat of the micro speaker unit is asymmetrical. The temperature of the heating part near the welding point is higher than the temperature of the heat transfer part near the voice coil 33 and away from the welding point. By increasing the thickness of the suspension 323 near the welding plate structure 4 side, that is, the thickness of the first diaphragm area 324, to improve the reduction of rigidity due to the asymmetry of the heat of the speaker unit. This ensures that when the vibration system 3 is working, the single unit of the micro speaker will not sway, so that the vibration of the vibration system 3 is stabilized, thereby improving the sound quality of the micro speaker.

Referring to FIG. 3-FIG. 6, in the first embodiment, the thickness of the first diaphragm area 324 gradually decreases in the direction away from the welding plate structure 4. The outer surfaces of the first diaphragm area 324 and the second diaphragm area 325 smoothly transition to ensure the stability of the vibration system 3.

Figure 2:
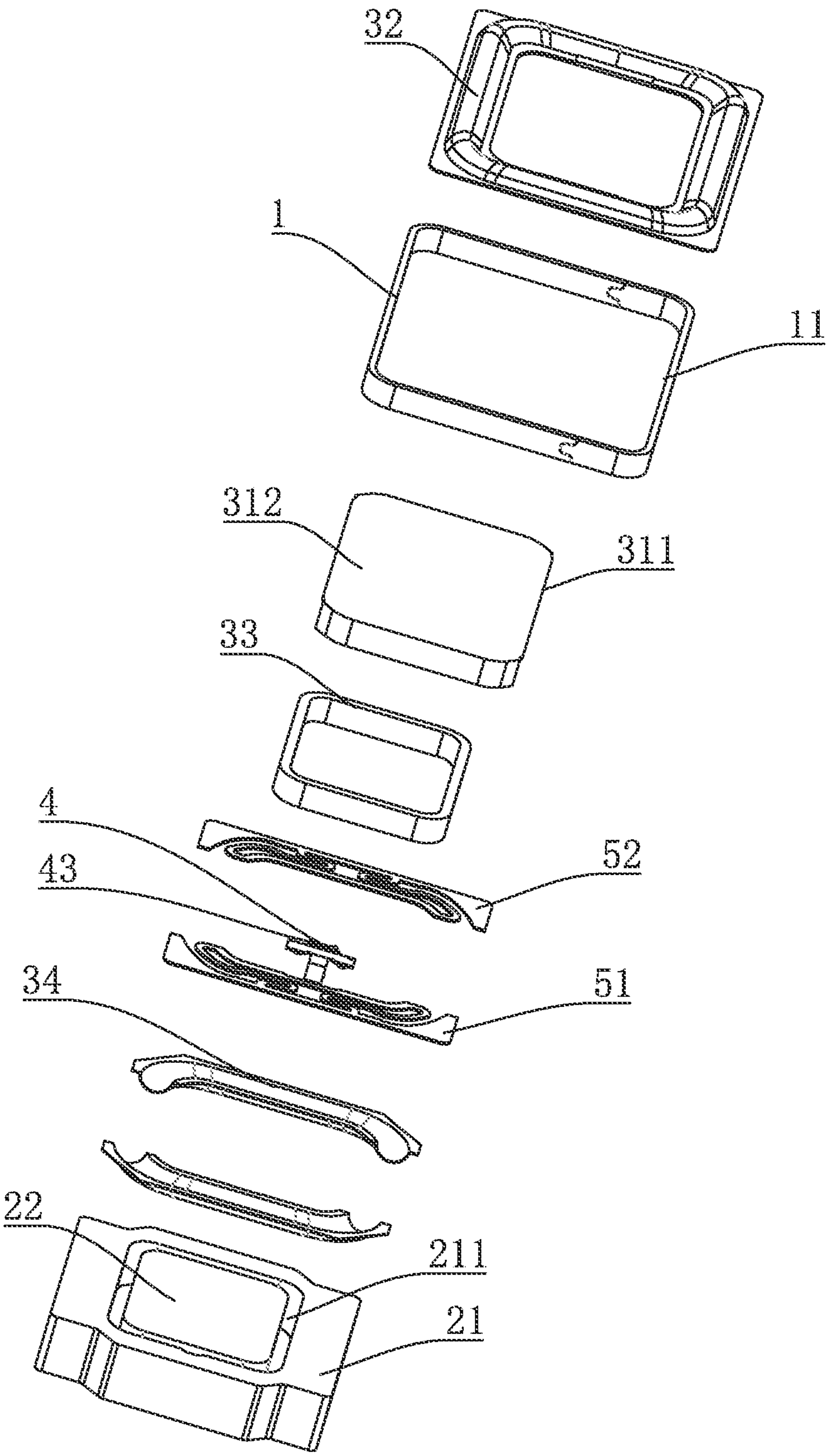
FIG. 2 is an isometric and exploded view of the micro speaker in FIG. 1.
Figure 3:
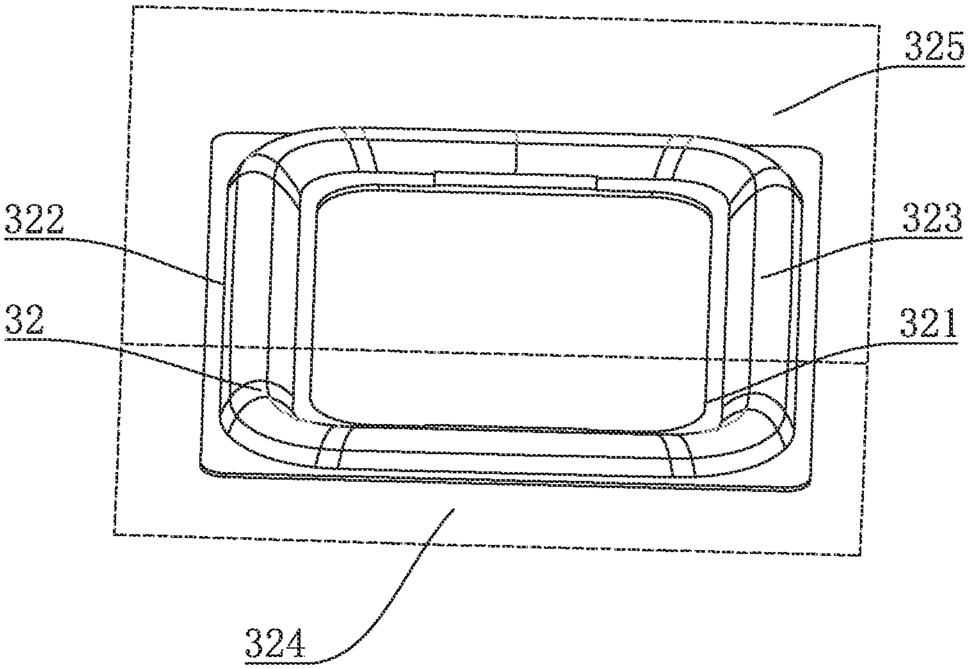
FIG. 3 is an isometric view of a vibration diaphragm of the micro speaker of the embodiment.
Figure 4:
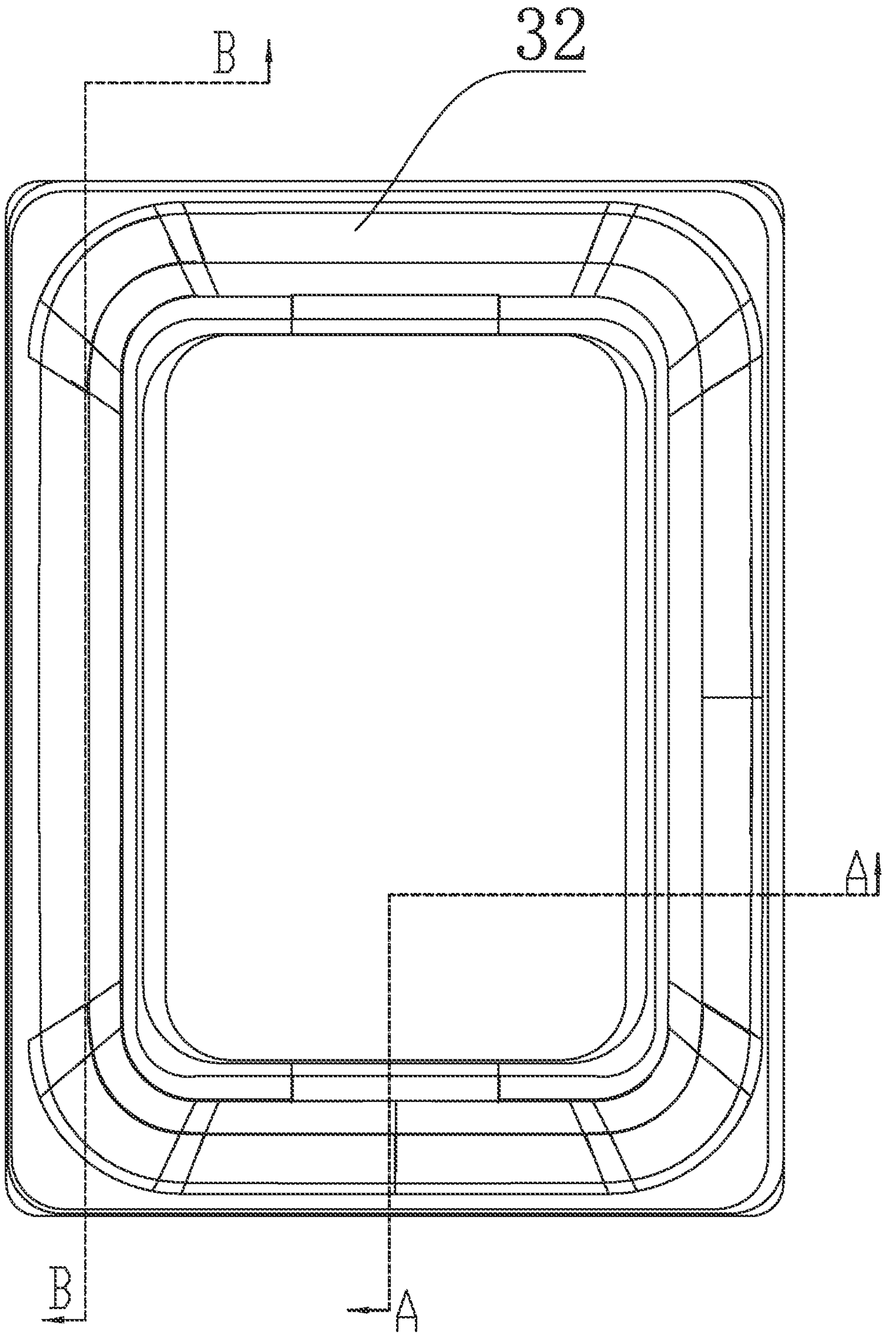
FIG. 4 is a top view of the micro speaker.
Figure 5:
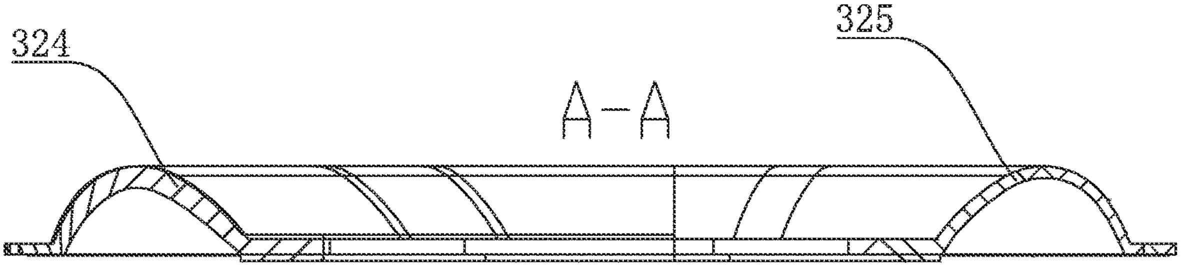
FIG. 5 is a cross-sectional view of the micro speaker taken along line A-A in FIG. 4.
Figure 6:
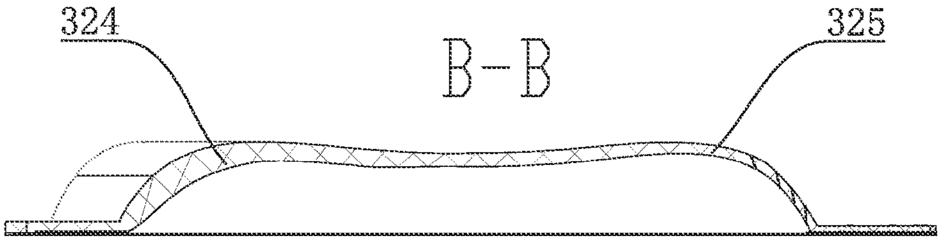
FIG. 6 is a cross-sectional view of the micro speaker taken along line B-B in FIG. 4.

Please refer to FIGS. 1-2 and 6, in this embodiment, the dome skeleton 31 includes a bottom plate 312 connected to the first diaphragm 32 and two side walls 311 bending and extending from the two opposite edges in the long axis direction of the bottom plate to the magnetic circuit systems 2. The bottom plate 312 is fixedly connected to the first fixation part 321, and the voice coil 33 is fixed to the plate surface of the bottom plate 312 close to the magnetic circuit system 2. The welding plate structure 4 is fixed to the plate surface of the bottom plate 312 where a voice coil 33 is provided and located between a side wall 311 and the outer wall of the voice coil 33 close to the side wall 311 in the direction of the long axle.

Specifically, the bottom plate 312 can be a rectangular plate, the cross section of the voice coil 33 is in a rectangular shape, and the side wall 311 is vertically fixed to the plate surface of the bottom plate 312. And the side wall 311 is adapted to the side edge of the corresponding bottom plate 312. The end of the side wall 311 away from the bottom plate 312 is flush with the end of the voice coil 33 away from the bottom plate 312, which is beneficial to realize the close attachment of the dome skeleton 31 and the magnetic system.

When the voice coil 33 drives the dome skeleton 31 to vibrate, since the first diaphragm 32 is connected to the dome skeleton 31, the dome skeleton 31 will drive the first diaphragm 32 to vibrate. It can be understood that the heat generation of the part of the dome skeleton 31 near the welding plate structure 4 is greater than that of the dome skeleton 31 away from the welding plate structure 4 when the speaker is working. By setting the thickness of the first diaphragm area 324 to be greater than the thickness of the second diaphragm area 325, the rigidity of the structures on the left and right ends of the dome skeleton 31 is made symmetrical. During the vibration process, the dome skeleton 31 is evenly stressed and the vibration is stable, so that the dome skeleton 31 will not sway.

Figure 7:
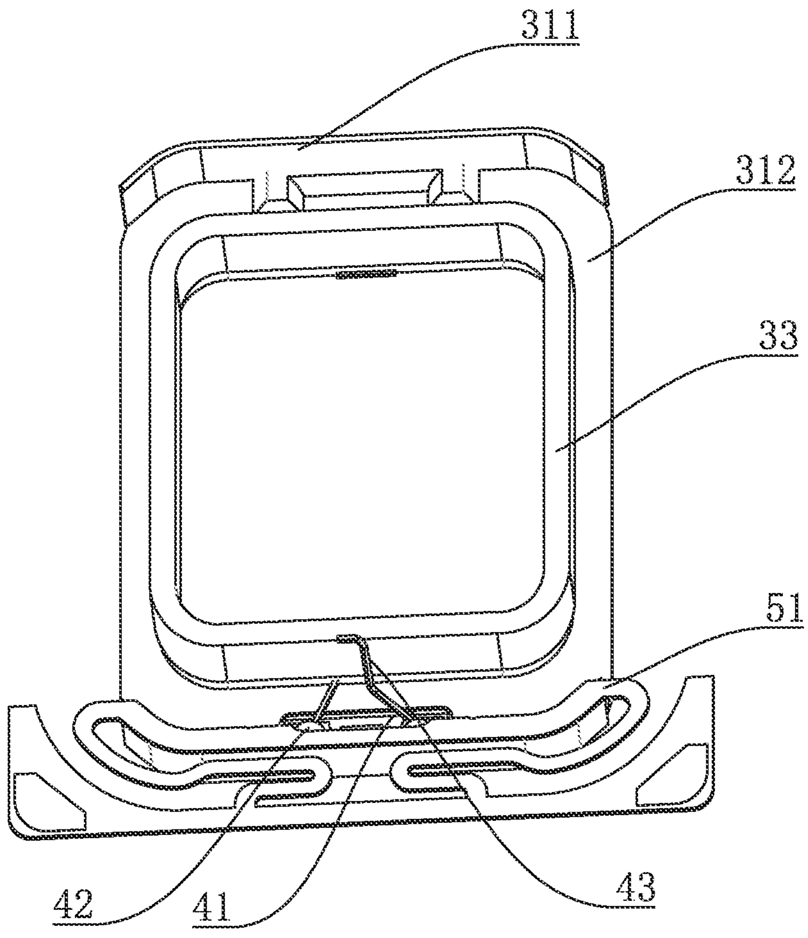
FIG. 7 shows a welding plate structure of the micro speaker.

Please refer to FIG. 2 and FIG. 7, in this embodiment, the ends of the first circuit board 51 and the second circuit board 52 that are far away from the frame 1 are respectively fixed to the end surfaces of the two side walls 311 that are far away from the bottom plate 312. The welding plate structure 4 includes a welding plate 41 fixed to the bottom plate 312, a welding ball 42 fixed to the welding plate 41, and the lead wire connected to the voice coil 33 and the welding ball 42 respectively. the welding plate 41 is electrically connected to the first circuit board 51.

In this embodiment, the first circuit board 51 and the voice coil 33 are connected to the welding balls 42 on the welding plate structure 4 through the lead wire 43 of the voice coil 33, respectively. When the micro speaker is working, the temperature of the structures near the welding plate structure 4 as the heating part and the first circuit board 51 is higher than the temperature of the structures near the lead wire 43 of heat transfer part. By setting the thickness of the first diaphragm area 324 to gradually decrease away from the welding plate structure 4, the outer surfaces of the first diaphragm area 324 and the second diaphragm area 325 smoothly transition. It can improve the rigidity reduction caused by heat and stabilize the vibration system 3.

In an optional embodiment, referring to FIGS. 1-2, it also includes two second diaphragms 34 arranged on the side of the frame 1 away from the first diaphragm 32. A second diaphragm 34 is fixedly connected to the side of the first circuit board 51 away from the first diaphragm 32. The other second diaphragm 34 is connected to the side of the second circuit board 52 away from the first diaphragm 32. In this embodiment, one end of the second diaphragm 34 is connected to the corresponding circuit board (the first circuit board 51 or the second circuit board 52), and the other end is connected to the frame 1.

In addition, the two second diaphragms 34 are arranged symmetrically with the center line of the bottom plate 312 as the symmetrical axle, which further ensures the symmetry of the overall structure of the vibration system 3. It can be understood that, on one side of the frame 1, the containment space 11 of the side of the frame 1 is sealed through the second diaphragm 34, the magnetic system 3 and the first circuit board 51 and the second circuit board 52. On the other side of the frame 1, the first diaphragm 32 and the bottom plate 312 are used to seal the containment space 11 thereby ensuring that the micro speaker is arranged with a sealed chamber.

Please refer to FIG. 1 and FIG. 2. In this embodiment, the magnetic circuit system 2 includes a first magnet 21 with a containment groove and a second magnet 22 contained in the containment groove. A circular magnetic gap is arranged between the second magnet 22 and the first magnet 21, and the voice coil 33 is embedded in the magnetic gap. In this embodiment, the first magnet 21 is fixed on the frame 1, the end of the second diaphragm 34 close to the first magnet 21 is connected to the first magnet 21, and the voice coil 33 is set in the magnetic gap 211 between the second magnet 22 and the first magnet 21.

When the voice coil 33 is energized, the voice coil 33 will vibrate under the action of the first magnet 21 and the second magnet 22, thereby driving the dome skeleton 31 to vibrate. Preferably, the shape of the side wall 311 of the first magnet 21 close to the second diaphragm 34 is adapted to the side edge of the second diaphragm 34 abutting against the first magnet 21, which is beneficial to achieve tight attachment of the second diaphragm 34 and the first magnet 21.

In a second aspect, the application provides a diaphragm mold, including a first mold and a second mold that encloses with the first mold to form a cavity, and the cavity matches the first diaphragm 32.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A micro speaker, comprising:

a frame with a containment space;

a magnetic circuit system accommodated in the containment space;

a vibration system accommodated in the containment space, including a first diaphragm arranged on one side of the frame, and a dome skeleton fixed to the first diaphragm;

a voice coil fixed to the dome skeleton near a side of the magnetic circuit system, including a lead wire;

a welding plate structure fixed on a side of the dome skeleton where the voice coil locates at, for being electrically connected to the lead wire; wherein the first diaphragm includes a first fixation part connected to the dome skeleton, a suspension connected to an outer side of the first fixation part, and a second fixation part connected to a side of the suspension away from the first fixation part and fixed to the frame;

the micro speaker further includes a first circuit board electrically connected to the welding plate structure and a second circuit board respectively fixed to two ends of the frame away from the second fixation par;

and wherein the first diaphragm includes a first diaphragm area whose projection along a vibration direction is located in a projection area of the first circuit board, and a second diaphragm area which is connected with the first diaphragm area and forms the first diaphragm together with the first diaphragm area; a thickness of the first diaphragm area is greater than a thickness of the second diaphragm area.

2. The micro speaker as described in claim 1, wherein the thickness of the first diaphragm area gradually decreases in a direction away from the welding plate structure.

3. The micro speaker as described in claim 2, wherein outer surfaces of the first diaphragm area and the second diaphragm area have a smooth transition.

4. The micro speaker as described in claim 1, wherein the dome skeleton includes a bottom plate connected to the first diaphragm and two side walls bending and extending toward the magnetic circuit system from two opposite edges in a direction of a long axle of the bottom plate; the bottom plate is fixedly connected to the first fixation part; the voice coil is fixed on the bottom plate near the plate surface of the magnetic circuit system; the welding plate structure is fixed to the bottom plate with the plate surface of the voice coil and located between one of the side wall and the outer wall in the direction of the long axle of the voice coil adjacent to the side wall.

5. The micro speaker as described in claim 4, wherein ends of the first circuit board and the second circuit board that are away from the frame are respectively fixed to the end surfaces of the two side walls that are away from the bottom plate.

6. The micro speaker as described in claim 5, wherein the welding plate structure includes a welding plate fixed on the bottom plate, a welding ball fixed on the welding plate, and the lead wire of the voice coil connects to the welding ball; the welding plate is electrically connected to the first circuit board.

7. The micro speaker as described in claim 4, further comprising two second diaphragms respectively disposed on the side of the frame away from the first diaphragm; one of the second diaphragms is fixedly connected to the side of the first circuit board away from the first diaphragm, the other second diaphragm is connected to the side of the second circuit board away from the first diaphragm.

8. The micro speaker as described in claim 1, wherein the magnetic circuit system includes a first magnet with a containment groove and a second magnet contained in the containment groove for forming a circular magnetic gap therebetween.

9. A diaphragm mold, comprising a first mold and a second mold enclosing a cavity with the first mold, wherein the cavity is matched with the first diaphragm as described in claim 1.

* * * * *